United States Patent [19]
Marsh, Jr.

[11] 3,884,509
[45] May 20, 1975

[54] PIPE COUPLING DEVICES

[76] Inventor: Richard O. Marsh, Jr., 701 Standard Life Bldg., Pittsburgh, Pa. 15222

[22] Filed: Nov. 16, 1973

[21] Appl. No.: 416,583

Related U.S. Application Data

[63] Continuation-in-part of Ser. No. 163,911, July 19, 1971.

[52] U.S. Cl. .................. 285/37; 285/348; 285/342; 285/364
[51] Int. Cl. ............................................. F16l 17/00
[58] Field of Search ............. 285/369, 254, 37, 112, 285/355, 390, 356, 348, 342

[56] References Cited
UNITED STATES PATENTS

| | | | |
|---|---|---|---|
| 2,104,351 | 1/1938 | Osborn ................................. | 285/37 |
| 2,143,279 | 1/1939 | Osborn ................................. | 285/37 |
| 2,420,838 | 5/1947 | Osborn ................................. | 285/37 |
| 3,477,745 | 11/1969 | Williams et al. ................ | 285/390 X |
| 3,552,781 | 1/1971 | Helland.............................. | 285/356 |

FOREIGN PATENTS OR APPLICATIONS

| | | | |
|---|---|---|---|
| 114,494 | 6/1940 | Australia.............................. | 285/37 |

*Primary Examiner*—Dave W. Arola
*Attorney, Agent, or Firm*—Buell, Blenko & Ziesenheim

[57] ABSTRACT

The specification discloses a number of pipe coupling devices for sealingly connecting the adjacent ends of two coaxially disposed pipe sections. All of the devices utilize a common principle for effecting compression of a gasket ring seal, namely the transfer of the turns of a spiral or helical band of relatively thin gauge metal from one side to the other of a cylindrical or disc-like radial wall in a housing, through a slotted opening in the housing wall or between two successive roller bearings carried on the housing, by relative rotation of the housing and the spiral or helical band coaxially with respect to the pipes to be joined. All embodiments have a pair of ring seals, one for each pipe section, the ring seals being integrally joined or separate. In certain embodiments, the ring seals are simultaneously or separately compressed by rotation of the housing with respect to the spiral or helical band. In other embodiments the helical band is bonded at opposite ends to a circular sleeve coaxial to the pipe and intervening between the pipe and the housing. In these embodiments, compression of the gasket ring seals may be effected by rotation of the circular sleeves relative to the housing or vice versa.

18 Claims, 22 Drawing Figures

PIPE COUPLING DEVICES

This is a continuation-in-part of my co-pending application Ser. No. 163,911, filed July 19, 1971.

This invention relates to pipe coupling devices, especially to threadless couplings for sealingly joining adjacent sections of pipe, especially pipe of relatively large diameter such as is commonly used in pipelines for water, gas and the like.

In laying pipelines, it is a common present-day practice to join adjacent pipe sections on the job site by welding together the juxtaposed ends of coaxially laid pipe sections. This operation requires skilled personnel and a careful checking of the welds to assure leak proof joints. Various non-welded seals have been proposed, but those have drawbacks of complexity and the like.

In order to avoid the difficulties and disadvantages inherent in prior pipe couplings and in welding large diameter pipe in the field and, at the same time, enable employment of relatively unskilled personnel, I propose to provide threadless coupling devices of novel construction capable of installation on adjacent sections of pipe in the field by relatively unskilled personnel.

More particularly, I propose to provide pipe coupling devices for sealingly coupling juxtaposed ends of pipe sections. The devices employ ring-type gasket seals encircling the ends of the pipe sections, the gasket ring seals being compressed by the expansive forces set up by transferring the turns or bends of a spiral or helical band or strip, of relatively thin gauge metal, from one side to the other of a coaxial sleeve or end disc forming part of the coupling housing. One end of the spiral band is anchored to the gasket ring and the turns of the band are threaded through a slotted opening in the sleeve or disc, transfer of the turns of the band from one side to the other of the sleeve or disc resulting from rotation of the sleeve or disc concurrently with the coupling housing. In certain embodiments, the gasket ring seals are integrally joined to form a unitary ring seal which straddles the gap between the adjacent ends of the pipe sections while in other embodiments separate gasket ring seals are carried by the coupling housing at opposite sides of the gap between the pipe sections.

I further propose to provide pipe coupling devices of the aforedescribed type in which the cooperative action of the gasket ring seal and the coupling housing incidental to a coupling operation causes circumferential contraction of split metal rings respectively encircling the adjacent pipe sections, thereby providing a tension connection between the adjacent pipe sections and also insuring electrical conductivity between pipe sections.

I further propose to provide pipe coupling devices of the aforedescribed types, wherein a helical band is welded at opposite ends to a rotary sleeve, one end of which extends coaxially into each of the circular end openings of the housing, and through which the pipe sections are pushed toward the center of the coupling. In several embodiments employing this principle, the helical bands may be screwed into the housing to compress the ring seals, by rotation of the sleeve relative to the housing or, vice versa, by rotation of the housing relative to sleeve.

In certain embodiments employing the rotary sleeve, the turns of the helical band extend through a circumferential slot in the end wall of the housing, while in others the turns of the helical band extend between two successive roller bearings of a series that are disposed for rotation on radial axes in uniform circumferentially spaced relation.

In another embodiment employing the rotary sleeve, a wide metal spacer ring is interposed between each ring seal and the inner turn of the helical band thereby enabling the outer end of the rotary sleeve to be welded to the outer face of the end wall of the housing and to the pipe section, after severance of the sleeve circumferentially flush with the end wall, to provide a permanent coupling connection. In this embodiment, I provide a split metal ring which encircles a pipe section and contracts therearound to provide a tension connection upon exertion of an axial force on the wide spacer ring to compress the ring seal.

Other advantages and features of my novel pipe coupling devices will become apparent in the forthcoming detailed description thereof when read in connection with the accompanying drawings, wherein:

Referring to FIGS. 1 to 4 of the drawings, the embodiment of the pipe coupling device is shown as coupling two sections of pipe 10 and 10'. The coupling device itself comprises an annular housing or cylindrical sleeve 11 which in coupling position straddles the gap between the two pipe sections 10 and 10'. A wide spiral band 12 of relatively thin gauge metal closely surrounds and is centered on the sleeve 11, and an annular sealing ring 13 of suitable material such as rubber is coaxially contained within the sleeve. To the outer surface of sealing ring 13 is bonded or otherwise secured the inner end or turn of the spiral band 12 which extends through a radial slot 14 in the wall of sleeve 11.

Figure 1:
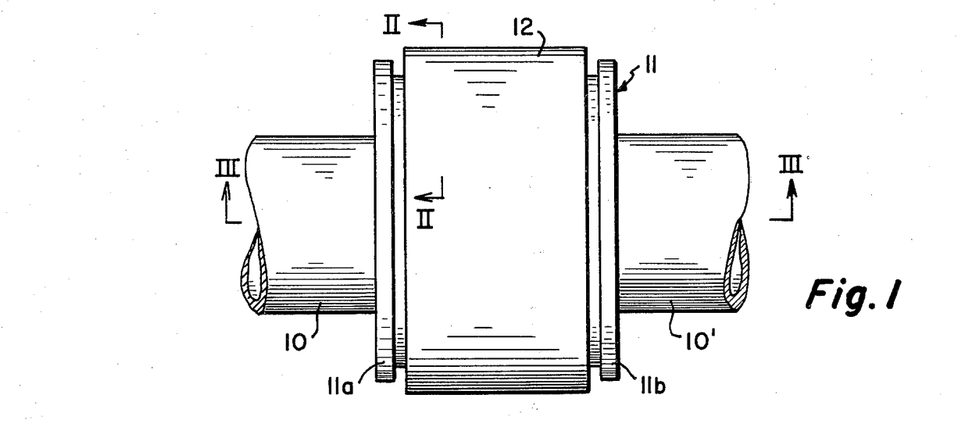
FIG. 1 is an elevational view, showing one form of pipe coupling device embodying my invention.
Figure 2:
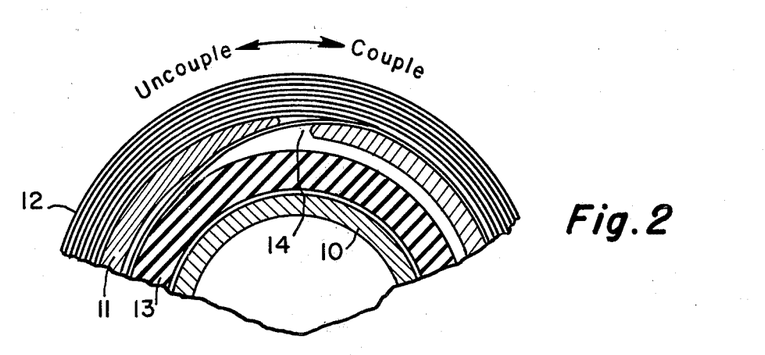
FIGS. 2 and 3 are fragmental sectional views, taken respectively on the lines II—II and III—III of FIG. 1.
Figure 3:
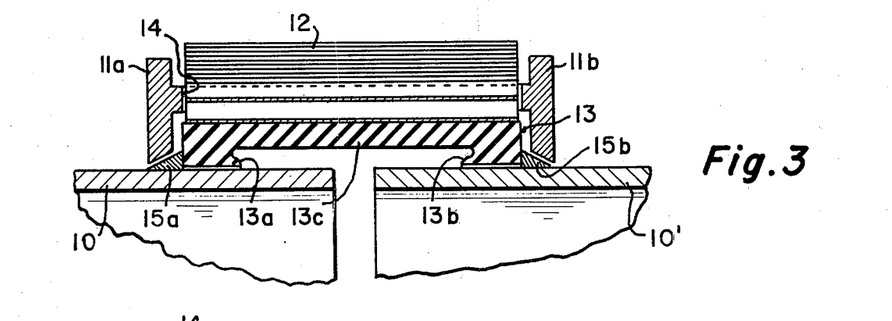

Sealing ring 13 comprises two gasket ring seals 13a and 13b, respectively surrounding pipe section 10 and 10'. As shown, gasket ring seals 13a and 13b are formed as an integral unit joined by a cylindrical bridge 13c. The gasket ring seals 13a and 13b may be separately constituted however, as will be apparent from other embodiments to be later described. When the gasket ring seals 13a and 13b are peripherally compressed in the manner later described, a sealed connection between the pipe sections 10 and 10' is provided.

At opposite ends of the sleeve 11 are formed or attached end rings 11a and 11b respectively. The outer peripheral portion of each of the end rings constitutes a rim by which the sleeve may be manually grasped and turned coaxially with respect to the pipe sections 10 and 10'. The surface of the rims may be roughened or knurled so as to provide for greater ease in grasping the rims to effect turning of the sleeve.

The surface at the central opening of each of the end rings 11a and 11b is beveled or conically formed and a correspondingly beveled metallic split ring or washer 15a and 15b is interposed between the beveled opening in the end rings and the pipe section 10 or 10'. The inner edge of the split rings 15a and 15b abuts the corresponding outer ends of the rubber sealing ring 13. The inner peripheral surface of the split rings 15a and 15b is roughened or knurled so as to effectively grip the surface of the pipe sections when circumferentially compressed in the manner later described.

In operation, let it be assumed that the two pipe sections 10 and 10' lie in coaxial relation with their ends in closely spaced but separated relation. To couple the ends of the pipe sections, the coupling is first telescopically slipped over the end of one of the pipe sections and then similarly slipped over the end of the other pipe section.

Figure 4:
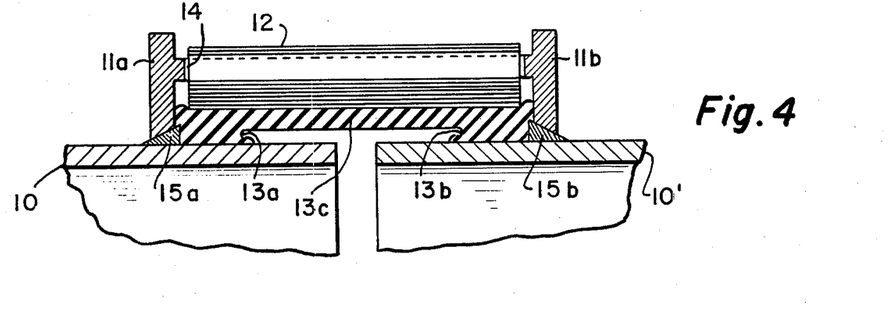
FIG. 4 is a fragmental sectional view, corresponding to FIG. 3, except differing in that the gasket ring seal is shown under compression.

In order to couple the ends of the two pipe sections, the sleeve 11 is turned manually in the coupling direction indicated in FIG. 2. Such manual turning may be accomplished by two men separately grasping end rings 11a and 11b respectively, or by power tool means. When the sleeve 11 is turned in the coupling (clockwise) direction as viewed in FIG. 2, the smooth rounded edge of the slot 14 is progressively shifted between successive turns of the spiral band 12, thereby causing the turns of the band to be transferred from the outside of sleeve 11 to the inside of the sleeve. It will be seen that as the number of turns of the spiral band 12 within the sleeve 11 increases, a peripheral or circumferential compression force is exerted on the gasket ring seals 13a and 13b of sealing ring 13, which ultimately causes the ring seals 13a and 13b to assume a tightly gripping sealing position around the pipe sections 10 and 10' respectively as shown in FIG. 4. Concurrently with compression of the gasket seals 13a and 13b the sealing ring 13 is expanded in axial length, thereby exerting an outward axial force on the split rings 15a and 15b. Due to the coaction with the beveled inner periphery of the end rings 11a and 11b, the split rings 15a and 15b are circumferentially constricted around the surface of the pipe sections into gripping relation therewith. Thus as the outward force on the split rings 15a and 15b increases, the sleeve 11 is longitudinally tensioned, thereby exerting a force tending to pull the two pipe sections toward each other. Also, where it is a desired factor, the electrical conductivity through the coupling joint between pipe sections 10 and 10' is assured via the split rings 15a and 15b.

Uncoupling of the coupling device from the pipe sections 10 and 10' simply requires rotation of the sleeve 11 in a reverse, that is counterclockwise, direction, as viewed in FIG. 2. As the number of turns of the spiral band 12 move progressively through the slot 14 to the outside of the sleeve, the compression force on the ring seal 13 decreases gradually until the ring seal expands to the position shown in FIG. 3, in which the pipe sections 10 and 10' are uncoupled.

Figure 5:
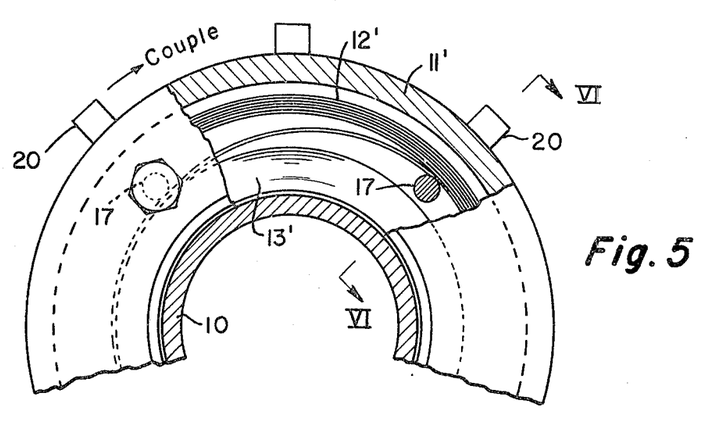
FIG. 5 is a fragmental sectional view, showing a variation of the form of coupling device shown in FIG. 2, and in which roller bearings are employed.
Figure 6:
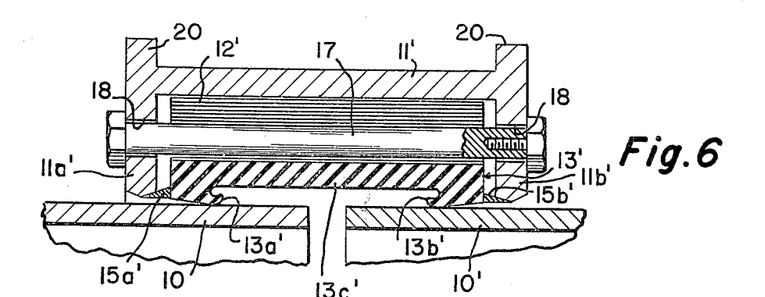
FIG. 6 is a fragmental sectional view, taken on the line VI—VI of FIG. 5.

A modified form of coupling device is shown in FIGS. 5 and 6. For the most part, the component parts are similar to those of the previously described embodiment and are designated by corresponding reference numerals with a "prime" suffix and without repeated description. The essential difference between the present and the former embodiment consists in providing a series of circumferentially spaced roller bearings 17 formed as by bolts, rotatably journalled in axially registering holes 18 in end rings 11a' and 11b' to sustain the outward thrust force due to the increase in the number of turns of the spiral band 12' effective to compress the rubber ring seal 13'. Roller bearings 17 serve to diminish the force required to turn the sleeve 11', particularly in the coupling direction. A series of peripherally spaced lugs 20 are formed on the outer rim of each of the end rings 11a' and 11b' to assist in applying a turning torque to the entire sleeve 11'. It will be noted also that in this embodiment, the spiral band 12' remains completely within the sleeve 11' and that the roller bearings 17 serve to separate the compressing from the non-compressing turns of the spiral band 12'.

Figure 7:
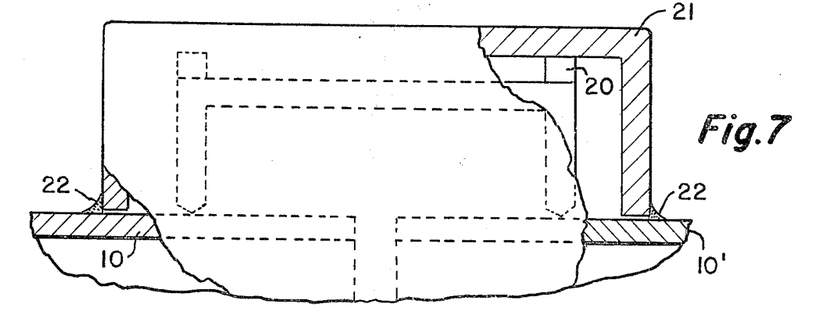
FIG. 7 is a fragmental view, partially in section, showing the combination with the form of coupling device in FIGS. 5 and 6 of a cylindrical shroud.

Referring to FIG. 7, there is shown a variation of the coupling device of FIGS. 5 and 6, which consists simply in surrounding the coupling device with an integral housing or shroud 21. After the coupling has been tightened the openings are closed by a continuous circumferential weld to the pipe sections 10 and 10', as indicated by the reference numerals 22. This composite type coupling provides a very strong and rigid coupling between the pipe sections.

Figure 8:
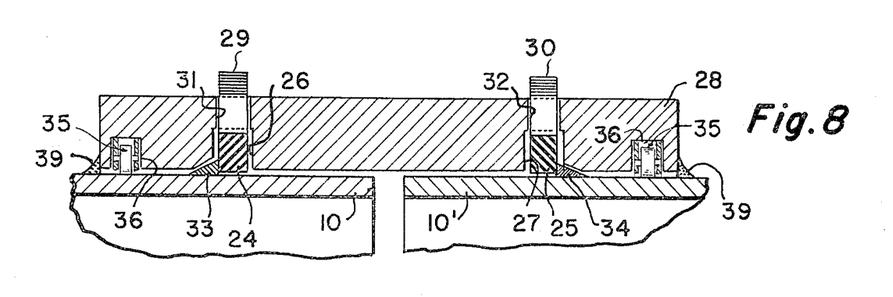
FIG. 8 is a fragmental sectional view, showing another form of coupling device embodying my invention.

The form of coupling device shown in FIG. 8 utilizes the basic principle of heretofore described embodiments, namely increasing the number of turns of a spiral band of relatively thin gauge metal effective to exert a radial thrust on a compression ring seal. However, it differs from the previously described embodiments in that two separate compression ring seals 24 and 25 are provided in separate axially spaced grooves 26 and 27 open to the central bore of a common sleeve member 28. Spiral bands 29 and 30 are provided for the ring seals 24 and 25, respectively, the inner end of each band being suitably bonded or anchored to the outer surface of the ring seals 24 and 25 and the outer turns extending through a corresponding slot 31 and 32 to the outside of the sleeve member 28. The side walls of the grooves are radial and the grooves are wider than the ring seals to allow room for expansion axially when the ring seals are compressed. The outer edge of each of the grooves 26 and 27 is beveled and a split metallic ring 33 or 34 is interposed between the beveled edge of the groove and the pipe section, for the same purpose as split rings 15a and 15b of a previous embodiment.

Suitable roller-bearing races 35 are inset in circular grooves or recesses 36 adjacent opposite ends of the sleeve member 28, the roller bearings engaging the outer surface of the pipe sections 10 and 10' to reduce the effort required to turn the sleeve member.

In operation, rotation of the sleeve member 28 in a coupling direction from the uncoupled position shown causes compression of ring seals 24 and 25 against the outer surface of the pipe sections and also against the sides of the grooves 26 and 27, thereby also activating the split rings 33 and 34 into gripping relation with the outer surface of pipe sections 10 and 10'. Uncoupling is effected by rotation of the sleeve member in a direction opposite that for coupling.

If desired, the sleeve member 28 may be welded at its opposite ends along the edge of the end openings of the central bore to the respective pipe sections 10 and 10', as indicated at 39, to lock the sleeve member in its coupling position and also provide a stronger joint.

Figure 9:
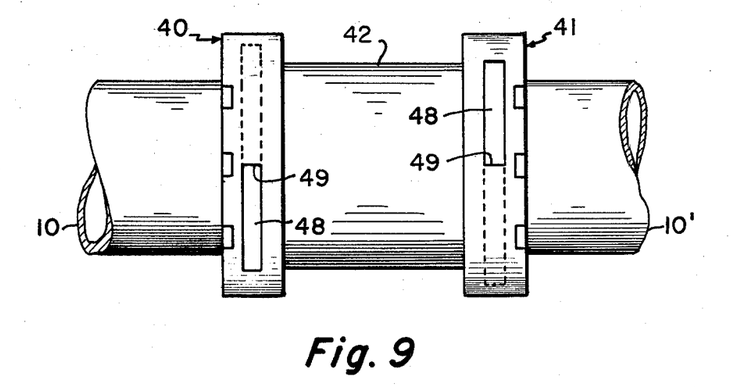
FIG. 9 is an elevational view, showing another form of coupling device embodying my invention.
Figure 10:
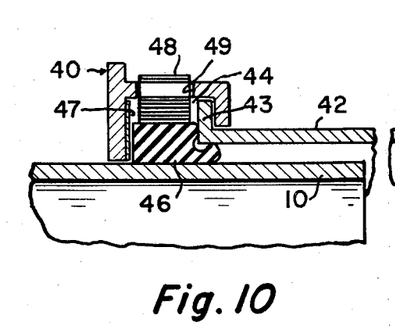
FIG. 10 is a fragmental sectional view showing a portion of the coupling in FIG. 9 with the gasket ring seal under compression.
Figure 11:
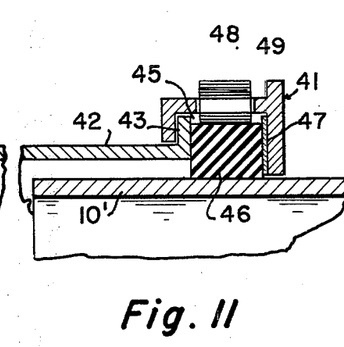
FIG. 11 is a fragmental sectional view, showing a portion of the coupling in FIG. 9 with the gasket ring seal free of compression.

Referring to FIGS. 9, 10 and 11, the coupling device shown therein comprises a sectionalized housing having two end rings 40 and 41, of channel-shaped cross section, separately rotatable at opposite ends of a connecting cylindrical sleeve 42. As seen from FIGS. 10 and 11, the cylindrical sleeve 42 has outwardly extending circular flanges 43 at opposite ends which are disposed within the channel-shaped interior of the corresponding end rings 40 and 41. As is apparent, the end rings are so positioned with respect to the sleeve 42 that the inner flange of the end rings contacts the end flanges 43 on the sleeve.

The space between the outer flange of each end ring 40 and 41 and the flange 43 on the sleeve 42 provides respective annular chambers 44 and 45 within which is disposed a ring seal 46 of rubber or rubber composition material. In order to reduce friction between the ring seals 46 and the outer flange of end rings 40 and 41, when the end rings are rotated, anti-friction washers 47 are provided therebetween.

Each of the ring seals 46 is surrounded by a spiral band or strip 48 of thin gauge metal. The inner end of band 48 is suitably bonded or anchored to the outer periphery of the ring seal and the outer turns extend through a slot 49 in the end ring to the outside thereof.

FIG. 11 shows the configuration of the ring seals 46 with the coupling device conditioned for uncoupling, that is, with the ring seals 46 relieved of compression, and with the majority of turns of the spiral band 48 being on the outside of the corresponding ring 41 or 40.

When it is desired to couple the two pipe sections 10 and 10', each of the end rings 40 and 41 is separately turned to transfer the turns of the corresponding spiral band to the inside of the end ring and thereby effect compression of the ring seal 46 against the side wall of the annular chambers and against the outer surface of the pipe section 10 or 10', in the manner illustrated in FIG. 10.

Uncoupling of the pipe sections 10 and 10' is effected by simply rotating the end rings 40 and 41 reversely to relieve the compression of the ring seals 46.

Figure 12:
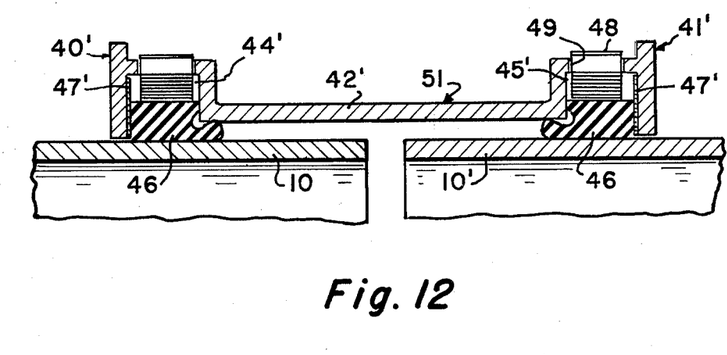
FIG. 12 is a fragmental sectional view, showing a variation of the form of coupling device in FIG. 9 which employs a unitary housing.

In FIG. 12 is shown a coupling device generally similar to that of FIGS. 9, 10 and 11, but differing therefrom in having an integral or one-piece cylindrical housing 51 including end rings 40' and 41' and a connecting sleeve 42'. In general, other components are identical to those in FIGS. 9, 10 and 11 and they are designated by the same reference numerals as in FIGS. 9, 10 and 11, without further description. The anti-friction washers 47' must be split or otherwise constructed to enable their installation within the annular chambers at each end of the housing 51.

In operation, the coupling device of FIG. 12 differs from that of FIGS. 9, 10 and 11 in that the entire housing 51 is rotated in one direction, or oppositely, to effect coupling and uncoupling respectively. Thus, in FIG. 12 both of the ring seals 46 are shown in coupled position, that is both compressed into gripping sealed relation to the pipe sections 10 and 10' as well as to the side walls of the annular chambers 44' and 45' in the housing 51. Obviously, upon reverse rotation of housing 51, both of the ring seals are simultaneously relieved of compression, in which condition the pipe sections may be separated and uncoupled.

In FIGS. 13 to 16 is shown another embodiment of a coupling device which differs generally from the foregoing embodiments in providing a different type of spiral band or strip in which the turns are substantially perpendicular to the longitudinal central axis of the spiral in contrast to the spiral bands of previously described embodiments wherein the turns are parallel to the axis of the spiral.

Figure 13:
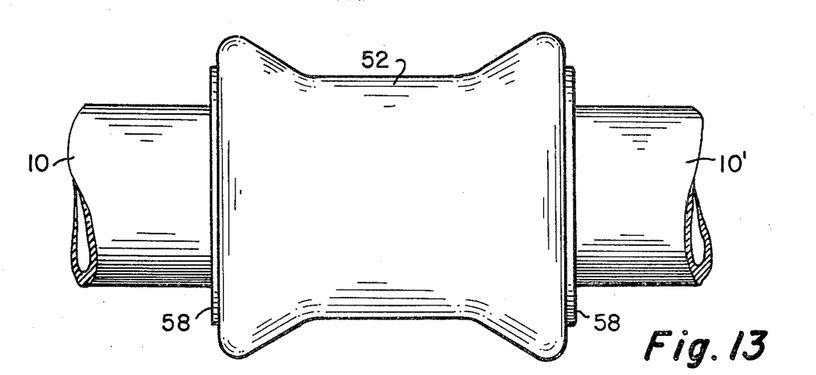
FIG. 13 is an elevational view, showing another form of coupling device embodying my invention.
Figure 15:
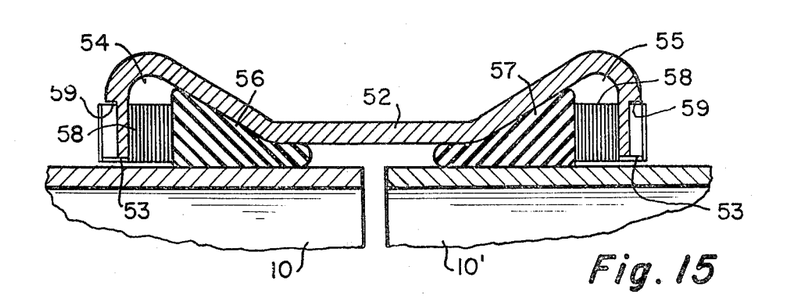
FIG. 15 is a fragmental sectional view, taken on the line XV—XV of FIG. 14, with the coupling device shown in coupled condition.

As seen in FIGS. 13 and 15, this form of coupling device comprises a generally cylindrical one-piece housing 52, the opposite end portions of which are divergently conical in contour and merge into radial disc-like end faces. The end faces have coaxially registering circular holes 53 into which the pipe sections 10 and 10' respectively project.

Disposed within the annular chambers 54 and 55 formed by the divergent conical end portions of housing 52 are ring seals 56 and 57. The ring seals 56 and 57 have coaxial central holes, through which the pipe sections extend and conical outer surfaces conforming to the inner conical surface within chambers 54 and 55. Interposed between the radial faces of each of the ring seals 56 and 57 and the corresponding end faces of the housing 52 is a spiral band or strip 58. The inner end turn of each spiral band is bonded or otherwise attached to the ring seals 56 and 57, and the outer turns of the spiral band extend through a radial slot 59 in the corresponding end face of the housing 52. A separate anchor for the inner end of the bands may also be employed.

Figure 14:
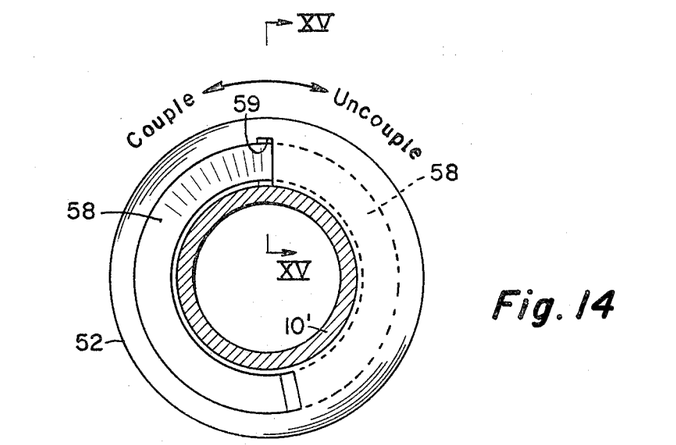
FIG. 14 is a profile view of the right end of the coupling device of FIG. 13.
Figure 16:
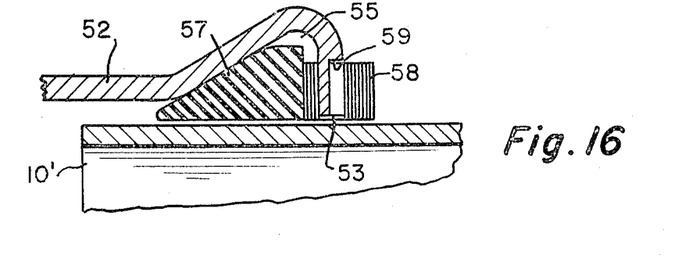
FIG. 16 is a fragmental sectional view corresponding to the right end portion of the coupling device shown in FIG. 15, with the coupling device shown in its uncoupled condition.

As seen in FIG. 16, the majority of the outer turns of the bands 58 are outside the end face of the housing 52, thereby relieving the ring seals 56 and 57 of compression. In this condition of the coupling device, pipe sections 10 and 10' may be freely inserted into the openings 53 in the end faces and removed therefrom. Assuming that the pipe sections are inserted into the opposite end faces of the coupling device, the coupling operation is effected by simply rotating the housing 52, in the appropriate direction, indicated in FIG. 14, until the ring seals 56 and 57 are compressively sealed against the pipe sections and the inner conical surface of the housing 52. The uncoupling operation is effected by rotation of the housing 52 oppositely, as indicated in FIG. 14.

Figure 17:
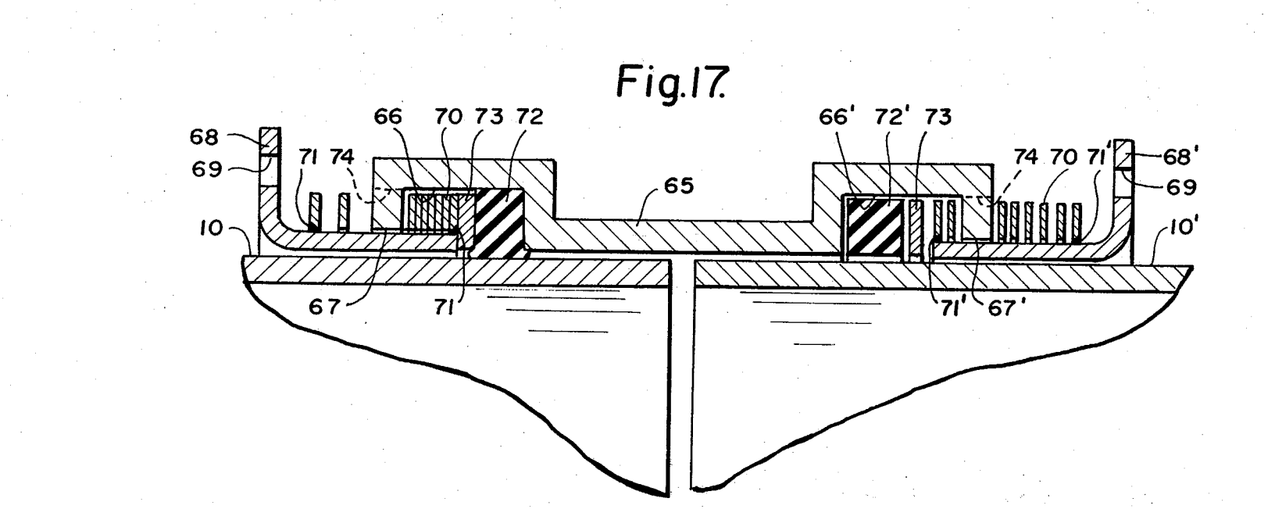
FIG. 17 is a fragmental longitudinal sectional view, showing another embodiment of my invention, in which an axial compression force is exerted on the ring seals by screwing the turns of a helical band into the coupling housing.

FIG. 17 shows a coupling differing somewhat in form from prior embodiments but being similar in principle. In this embodiment, a cylindrical housing 65 is provided having a central portion, the internal diameter of which is slightly larger than that of the pipe sections 10 and 10' to be joined; and opposite end portions larger in diameter than the central portion and having annular chambers 66 and 66' respectively formed therein. The radial outer end walls of chambers 66 and 66' have circular end openings 67 and 67', respectively, through which the pipe sections extend into the coupling. The circular end openings are sufficiently larger in diameter than the outer diameter of the pipe sections 10 and 10', to permit a circular sleeve 68, 68' to extend into the chambers 66 and 66'. The outer diameter of the sleeves 68, 68' is slightly less than that of the circular end openings 67, 67' so as to be slidably supported therein, while the internal diameter of the sleeves 68, 68' is slightly larger than the outer diameter of the pipe sections so as to permit the pipe sections to be inserted and removed freely from the coupling. The sleeves have an outwardly turned radial end flange with holes 69 therein for engagement by a spanner wrench to effect rotation of the sleeves.

A helical band 70 of relatively thin gauge metal (shown of exaggerated thickness for clarity in the drawings) is slipped coaxially over each of the sleeves 68, 68' and the end turns are secured to the sleeve as by spot welding at 71, 71'.

Ring seals 72, 72' are disposed concentrically within the chambers 66, 66', respectively. The ring seals are illustratively shown as approximately square in cross section to conform to the rectangular shape of the chambers 66, 66'. Interposed between the ring seals and the innermost end turn of the helical bands 70 is a split-ring washer 73 which serves to eliminate friction and wear between the ring seals and the innermost end turn of the helical bands when the sleeves 68, 68' are rotated relative to the housing or when the housing is rotated relative to the sleeves.

It will be understood that the innermost end turn of each of the helical bands 70 must have its extremity free to be inserted through a circumferential slot 74 in the end wall of the chambers 66, 66', which slot is slightly wider radially than the cross-sectional width of a turn of the helical band, in order to start the helical band for screwing into the chamber 66, 66'.

The right-hand end of the coupling is shown in the drawing in its open position in which the pipe section 10' may be freely inserted and removed therefrom. In this position the number of turns of the helical band 70 within the chamber 66', illustratively shown as two in number, are insufficient to exert a compressive force on the ring seal 72'.

To effect a seal, the sleeve 68, 68' is rotated, as by a spanner wrench, until the number of turns of the helical band 70 within each of the chambers 66, 66' becomes large enough to exert a compressive force on the ring seal 72, 72', sufficient to distort the ring seal into sealing engagement with the outer surface of the pipe section, as shown at the left-hand end of the coupling. It will be seen that the split-ring members 73 are frictionally engaged by the innermost end turn of the helical bands 70 as the sleeves are rotated. However, due to the reduced friction on the members 73, turning of the sleeves is thereby made easier than if the end turns of the helical band were in direct engagement with the rings seals. Moreover, wear on the ring seals due to rotation of the sleeves is eliminated.

It will be seen that the ring seals 72, 72' may be individually applied or compressed into sealing relation with the corresponding pipe section 10 or 10' simply by rotation of the corresponding sleeve 68, 68'. Alternatively, both ring seals 72, 72' may be concurrently applied by holding the sleeves 68, 68' stationary and rotating the housing itself in one direction relative to both of the sleeves so as to simultaneously increase the number of turns of the helical bands 70 within the chambers 66, 66'. It will be apparent that in such case, the helical bands 70 at opposite ends must be reversed with respect to each other.

Obviously, the ring seals may be released simply by reverse rotation of the sleeves 68, 68' or of the housing itself.

Figure 18:
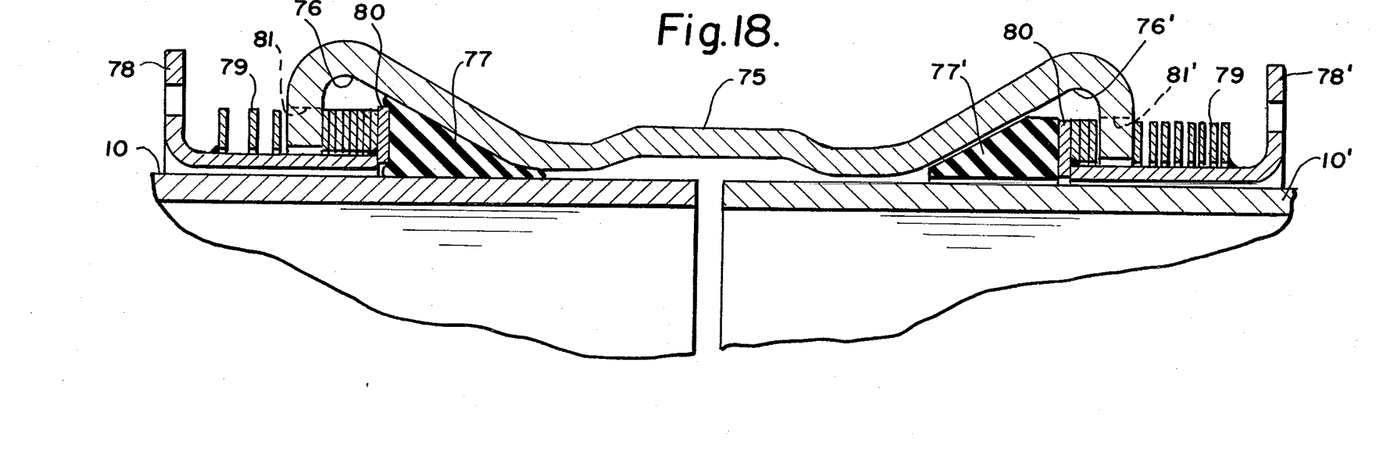
FIG. 18 is a fragmental longitudinal sectional view, showing a variation of the embodiment of FIG. 17 employing conically-shaped chambers in the coupling housing similar to those in FIGS. 13–16.

FIG. 18 shows a variation of the form of coupling shown in FIG. 17, wherein a cylindrical housing 75, similar to that of the embodiment of FIGS. 13–16, is employed. In this embodiment, the annular chambers 76, 76' in the housing are conical in shape and the ring seals 77, 77' are essentially triangular in cross-section.

Similarly to the coupling in FIG. 17, flanged sleeves 78, 78' are provided to which helical bands 79 are attached, as by welding. Also a split-ring washer 80 is interposed axially between the radial face of the ring seals 77, 77' and the innermost end turn of the helical bands 79, 79'.

As in the coupling of FIG. 17, the helical bands 79, 79' of FIG. 18 pass through a circumferential slot 81, 81' in the end wall of the housing incidental to the rotation or screwing action of the sleeves 78, 78'.

In operation, the compressive axial force exerted on the ring seals 77, 77' by the inward screwing of the sleeves 78, 78' from the position illustrated at the right-hand end of the coupling causes the sloping face of the ring seals 77, 77' to cooperatively react with the conical wall of the chamber 76, 76' so as to be compressed circumferentially into sealing relation with the pipe sections, as shown at the left-hand end of the coupling. Unscrewing of the sleeves 78, 78' from the coupling housing, restores the ring seals to their unsealing position, shown at the right-hand end of the coupling, in which the pipe sections 10, 10' may be removed axially from the coupling. Alternatively, both ring seals 77 and 77' may be simultaneously applied and released by corresponding rotation of the housing 75, while the sleeves 78 and 78' remain stationary, as in the embodiment of FIG. 17.

Figure 19:
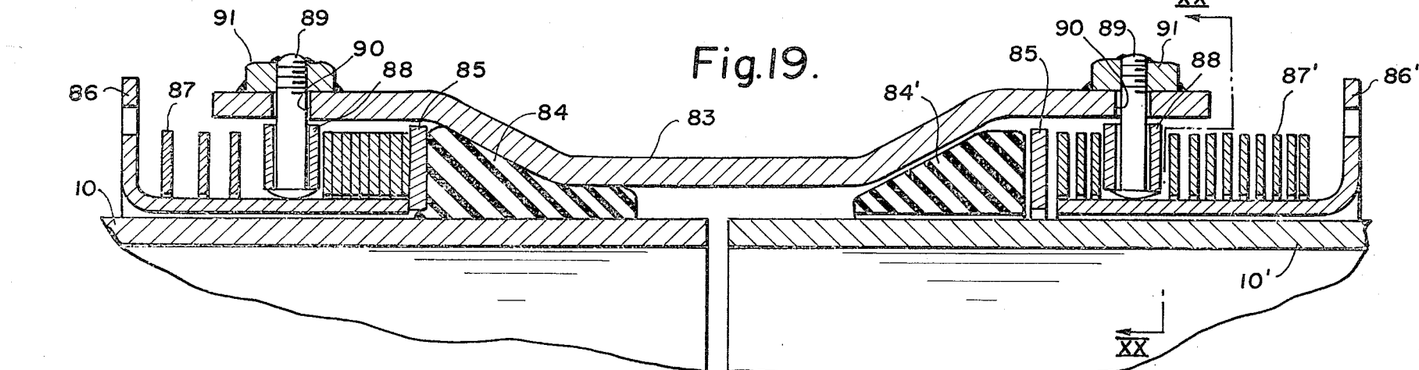
FIG. 19 is a fragmental longitudinal sectional view, showing another variation of the embodiment in FIG. 17, employing a series of radially disposed circumferentially spaced rollers carried on the housing and between which the turns of the helical band extend.
Figure 20:
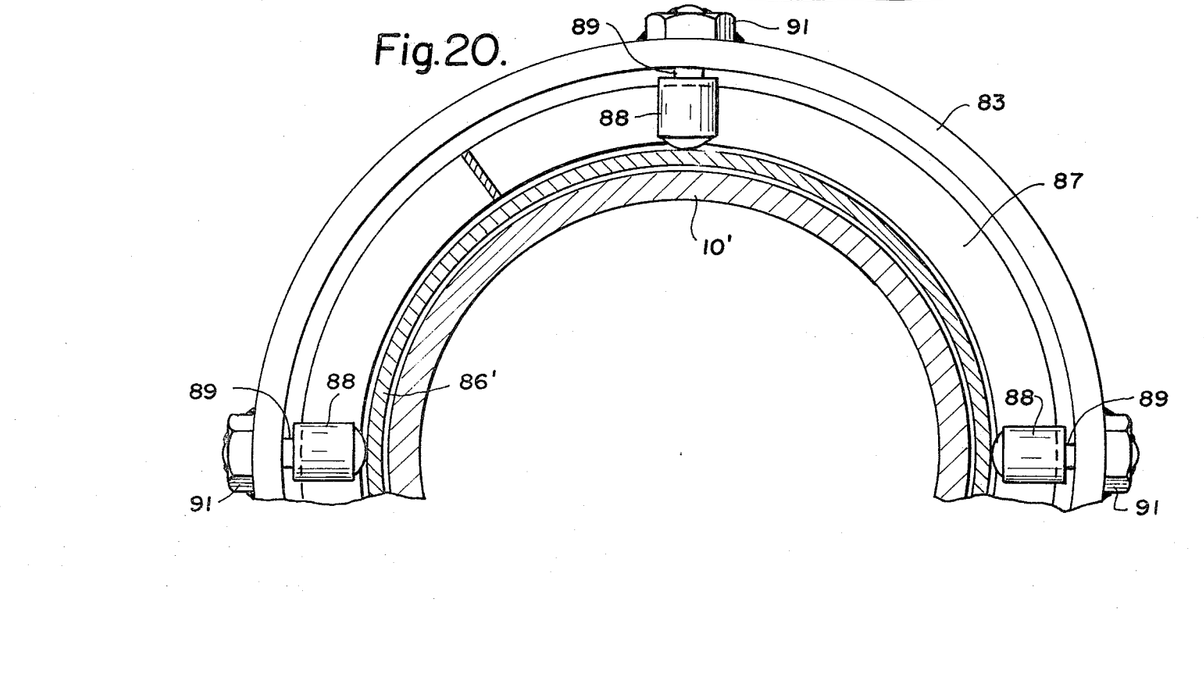
FIG. 20 is a fragmental transverse sectional view, taken on the line XX—XX of FIG. 19.

FIGS. 19 and 20 show a variation of the couplings of FIGS. 17 and 18, which is intended primarily to ease the force required to turn the flanged sleeves.

In this coupling, the housing 83 is essentially a circular tube the end portions of which are of the same diameter, with a central portion of reduced diameter connected to the end portions by sloping or outwardly divergent conical walls. There are thus formed at opposite ends of the housing 83 annular spaces within which to receive ring seals 84, 84' of triangular cross-section, split-ring washers 85, and flanged sleeves 86, 86' to which helical bands 87, 87' are attached as by spot welding.

In lieu of end walls, housing 83 has secured at opposite ends a series (shown in FIG. 20 as four in number) of radial roller bearings 88 mounted by bolts 89 in circumferentially spaced relation as shown. The outer ends of the bolts extend through holes 90 in the housing, and nuts 91 screwed on the ends of the bolts are welded to the housing. Also, the ends of the bolts are welded to the nuts 91.

As will be seen in FIG. 20, the turns of the helical bands 87, 87' pass between two circumferentially adjacent roller bearings 88, in going from one side to the other of the plane of the roller bearings.

In operation, the coupling is coupled and uncoupled in essentially the same manner as are the couplings of FIGS. 17 and 18. The coupling of FIGS. 19 and 20 is similar to that of FIG. 18 in that the axial force on the ring seals 84, 84', generated by increasing the number of turns of the helical bands 87, 87' inside the roller bearings, compresses the sloping face of the ring seals against the conical wall of the housing 83 to cause circumferential contraction of the ring seal around the pipe sections 10, 10' as shown at the left-hand end of the coupling. The coupling is released by unscrewing the sleeves 86, 86' to reduce the number of turns of the helical bands 87, 87' inside the roller bearings 88.

Alternatively, both ring seals 84, 84' may be simultaneously applied and released by corresponding rotation of the housing 83 with respect to the sleeves 86, 86' as in the embodiment of FIG. 17.

Figure 21:
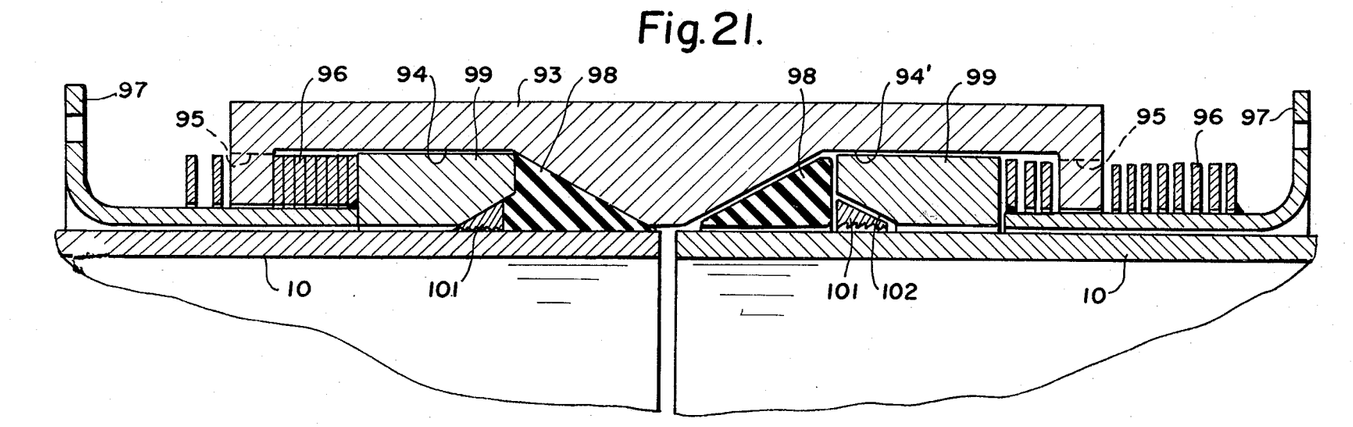
FIG. 21 is a fragmental longitudinal sectional view, showing another variation of the embodiment in FIG. 17.

FIG. 21 shows another form of coupling which is especially adapted for permanent attachment to the pipe sections 10, 10' to be joined. This coupling comprises a housing 93 which is essentially a circular tubing of uniform outer diameter. Formed internally of the housing are annular chambers 94, 94' which have converging or conical inner end walls adjacent the middle of the housing. From the outermost diameter of the conical end walls, the chambers 94, 94' are of uniform diameter extending out to the end wall of the housing. The opposite end walls of the housing each have a circumferential slot 95 through which extends the turns of a helical band 96 attached to a rotary sleeve 97.

Disposed within each of the chambers 94, 94' is a ring seal 98 of essentially triangular cross-section, a split spacer ring 99 of relatively wide axial dimension, and a split gripping ring 101. The conical sloping outer surface of each of the ring seals 98 engages the inner conical end wall of the corresponding chamber. The inner end of each of the spacer rings 99 abuts the flat radial face of the ring seal and the outer end of the ring 99 contacts the innermost end turn of the corresponding helical band 96. The gripping ring 101 is made of especially hard metal and the inner circular surface thereof is serrated for biting into the outer surface of the pipe sections. The outer surface of the gripping ring 101 is conical and conforms to a bevel or conical surface 102 on the inner end of the spacer ring 99. The gripping ring 101 is bonded to the bevel surface 102, by a suitable bonding agent. The strength of the bond is such that after the ring seal 98 is compressed into sealing contact with the pipe section, the bond breaks or releases with slight additional compressive pressure on the seal, thus causing the bevel surface 102 to circumferentially constrict the gripping ring 101 around the pipe section. With the gripping rings 101 both gripping their respective pipe sections 10 and 10', the two pipe sections are inhibited from being pulled outwardly out of the coupling and separated.

Figure 22:
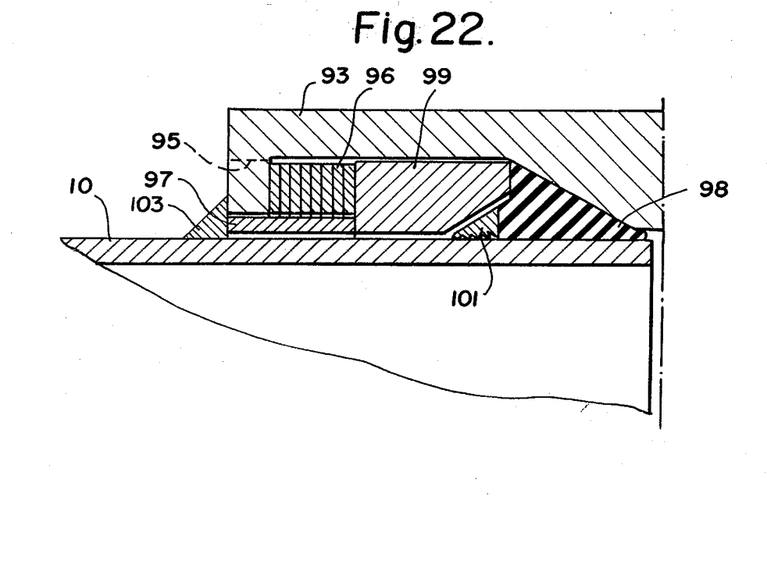
FIG. 22 is a fragmental longitudinal sectional view, showing the manner in which the embodiment of FIG. 21 may be altered to provide a permanent connection between pipe sections.

This embodiment of coupling may be employed for coupling and uncoupling pipe sections 10, 10' in the manner of previously described couplings, simply by screwing the sleeves 97 in or out of the housing. However, this coupling is especially adapted to provide a permanent connection between the pipe sections 10, 10', by first screwing both the sleeves 97 inwardly to the sealing position shown at the left of the coupling in FIG. 21, and then sawing or otherwise cutting off the bands 96 and sleeves 97 adjacent or flush with the end wall of the housing as shown in FIG. 22. After the bands and sleeves are cut off, the end walls of the housing 93 and the sleeves 97 are secured, as by welding circumferentially, to the outer surface of the pipe sections at 103. In this connection, the extended axial width of the spacer rings 99 serves to separate the ring seals 98, which are of rubber composition, from the end wall of the housing 93 sufficiently that the heat produced by applying a weld at 103 will not injure the ring seals 98 or impare their effectiveness.

While specific embodiments of the invention are shown and described herein, it will be apparent that variations therein may be made within the scope of the appended claims.

I claim:

1. A pipe coupling device for coupling two coaxially juxtaposed pipe sections, comprising an annular housing for surrounding the juxtaposed ends of the pipe sections, a pair of coaxially spaced gasket ring seals contained in said housing for respectively surrounding a corresponding one of said pipe sections, and preformed metal spiral band means for exerting a compression force on said gasket ring seals variable according to the number of turns of said band means introduced into said housing in surrounding relation to said seals, and means associating said band means and said housing whereby rotation of said housing in one direction varies the number of turns of the spiral band means within the housing effective to compress both said ring seals, said pair of coaxially spaced gasket ring seals being joined integrally by a connecting bridge portion and said spiral band means being coextensive with said bridge portion and exerting a compression force on both said ring seals simultaneously.

2. A pipe coupling device for coupling two coaxially juxtaposed pipe sections, comprising an annular housing for surrounding the juxtaposed ends of the pipe sections, a pair of coaxially spaced gasket ring seals contained in said housing for respectively surrounding a corresponding one of said pipe sections, and preformed metal spiral band means for exerting a compression force on said gasket ring seals variable according to the number of turns of said band means introduced into said housing in surrounding relation to said seals, and means associating said band means and said housing whereby rotation of said housing in one direction varies the number of turns of the spiral band means within the housing effective to compress both said ring seals, said spiral band means coaxially surrounding both said gasket ring seals, and the said means associating the band means and the housing including slot means in said housing through which turns of said band means within said housing join with turns of said band means coaxially surrounding the housing.

3. A pipe coupling device for coupling two coaxially juxtaposed pipe sections, comprising an annular housing for surrounding the juxtaposed ends of the pipe sections, a pair of coaxially spaced gasket ring seals contained in said housing for respectively surrounding a corresponding one of said pipe sections, and preformed metal spiral band means for exerting a compression force on said gasket ring seals variable according to the number of turns of said band means introduced into said housing in surrounding relation to said seals, and means associating said band means and said housing whereby rotation of said housing in one direction varies the number of turns of the spiral band means within the housing effective to compress both said ring seals, said spiral band means coaxially surrounding said ring seals, and the said means associating the band means and the housing including a plurality of anti-friction roller bearings carried by said housing in circumferentially spaced relation, said roller bearings separating the turns of the band means effective to compress the ring seals from these which are non-effective, variation in the relative number of effective and noneffective, turns occurring in consequence of rotation of the housing coaxially relative to the pipe sections.

4. A pipe coupling device for coupling two coaxially juxtaposed pipe sections, comprising an annular housing for surrounding the juxtaposed ends of the pipe sections, a pair of coaxially spaced gasket ring seals contained in said housing for respectively surrounding a corresponding one of said pipe sections, and preformed metal spiral band means for exerting a compression force on said gasket ring seals variable according to the number of turns of said band means introduced into said housing in surrounding relation to said seals, and means associating said band means and said housing whereby rotation of said housing in one direction varies the number of turns of the spiral band means within the housing effective to compress both said ring seals, said housing comprising radial end walls having circular openings closely surrounding the pipe sections, said end walls being beveled at the inner end of said openings and a split ring beveled correspondingly to said beveled end walls at said openings being disposed within each of said openings, the axial expansion of said ring seals due to compression by said band means forcing said split rings into cooperative relation with said beveled end walls to effect a circumferential constriction of said split rings around the pipe sections.

5. A pipe coupling according to claim 2, wherein a cylindrical shroud is provided around the said housing and adapted for welding to the pipe sections.

6. A pipe coupling according to claim 3, wherein said annular housing comprises two annular chambers in axially spaced relation for respectively surrounding the pipe sections, said pair of gasket ring seals being respectively so disposed and confined in said chambers that compression of said ring seals effects a seal thereof with the pipe sections, and wherein said preformed metal spiral band means comprises two parts, one for each of said two annular chambers.

7. A pipe coupling according to claim 3, wherein said annular housing comprises a pair of annular end portions and an intervening sleeve portion, the end portions each being individually rotative coaxially relative to the sleeve portion, wherein said pair of gasket ring seals are respectively disposed and confined in said end portions, and wherein said preformed metal spiral band means comprises two parts, one for each of said pair of end portions, compression of each of said ring seals by one of said band means responsive to individual rotation of the end portions effecting a seal thereof with the corresponding pipe section.

8. A pipe coupling for coupling two coaxially juxtaposed pipe sections, comprising an annular housing for surrounding the juxtaposed ends of the pipe sections, a pair of coaxially spaced gasket ring seals contained in said housing for respectively surrounding a corresponding one of said pipe sections, and preformed metal spiral band means for exerting a compression force on said gasket ring seals variable according to the number of turns of said band means introduced into said housing in surrounding relation to said seals, and means associating said band means and said housing whereby rotation of said housing in one direction varies the number of turns of the spiral band means within the housing effective to compress both said ring seals, said annular housing comprising two annular chambers in axially spaced relation for respectively surrounding the pipe sections, said pair of gasket ring seals being respectively so disposed and confined in said chambers that compression of said ring seals effects a seal thereof with the pipe sections, flat annular anti-friction bearing members being interposed between the housing and the ring seal in said annular chambers to ease the manual effort of rotating said housing.

9. A pipe coupling device for coupling two coaxially juxtaposed pipe sections, comprising a cylindrical sleeve for closely surrounding the juxtaposed ends of the pipe sections, said sleeve having an internal bore, and a pair of axially spaced annular grooves opening into said bore, a gasket ring seal disposed in each of said grooves, a spiral band coaxially surrounding each of said ring seals, said sleeve having a radial slot by which each of said grooves is connected to the outer surface of said sleeve, some of the turns of each of said spiral bands being within the corresponding groove and the remainder concentrically surrounding the outer surface of the sleeve, the turns inside the groove being joined with those outside the groove through the corresponding one of said radial slots, rotation of said sleeve coaxially of the pipe sections causing a variation in the relative number of inside and outside turns of both of said bands simultaneously whereby to couple and uncouple the pipe sections, and anti-friction means arranged for supporting the said cylindrical sleeve on the pipe sections for rotation coaxially with respect thereto.

10. A pipe coupling device for coupling two coaxially juxtaposed pipe sections, comprising an annular housing for surrounding the juxtaposed ends of the pipe sections, a pair of coaxially spaced ring seals contained in said housing for respectively surrounding a corresponding one of said pipe sections, and preformed metal spiral band means for exerting a compression force on said ring seal variable according to the number of turns of said band means introduced into said housing in abutting relation to said ring seals, and means associating said band means and said housing whereby rotation of said housing relative to said band means varies the number of turns of the spiral band means within the housing effective to compress both said ring seals, and whereby rotation of said band means relative to said housing varies the number of turns of the spiral band means within the housing effective to compress said ring seals individually.

11. A pipe coupling device for coupling two coaxially juxtaposed pipe sections, comprising an annular housing for surrounding the juxtaposed ends of the pipe sections, a pair of coaxially spaced ring seals contained in said housing for respectively surrounding a corresponding one of said pipe sections, and preformed metal spiral band means for exerting a compression force on said ring seals variable according to the number of turns of said band means introduced into said housing in abutting relation to said ring seals, and means associating said band means and said housing whereby relative rotation of said housing and said band means varies the number of turns of the spiral band means within the housing effective to compress at least one of said rings seals against said housing and the end of the associated pipe section, wherein said annular housing comprises a central tubular portion and conical end portions outwardly divergent from the tubular portion, said end portions each having a radial end wall and a conical wall cooperating to form an annular chamber, wherein said ring seals are respectively disposed in said annular chambers and have a conical surface cooperating with the respective conical wall, wherein the spiral band means is in the form of two helical bands each coaxial to a corresponding one of said end walls, the turns of said helical bands passing through an opening in the corresponding end wall into the annular chamber and the innermost end turn of each helical band abutting the ring seal within said annular chamber, an increase in the number of turns of the helical band within an annular chamber being effective to produce an axially compressive force on the ring seal which in cooperation with the conical wall of the annular chamber is thereby activated into sealing relation with the associated pipe section.

12. A pipe coupling device for coupling two coaxially juxtaposed pipe sections, comprising an annular housing for surrounding the juxtaposed ends of the pipe sections, a pair of coaxially spaced ring seals contained in said housing for respectively surrounding a corresponding one of said pipe sections, and preformed metal spiral band means for exerting a compression force on said ring seals variable according to the number of turns of said band means introduced into said housing in abutting relation to said ring seals, and means associating said band means and said housing whereby relative rotation of said housing and said band means varies the number of turns of the spiral band means within the housing effective to compress at least one of said ring seals against said housing and the end of the associated pipe section, wherein the said means associating the band means and the housing comprises a plurality of circumferentially spaced roller bearings carried at opposite ends of said housing and oriented for rotation on a radial axis, the turns of the band means being arranged to pass through the space between two successive roller bearings from one side to the other of said bearings.

13. A pipe coupling device for coupling two coaxially juxtaposed pipe sections, comprising an annular housing having two coaxially spaced annular chambers for respectively surrounding the pipe sections, each chamber having a radial end wall with a central circular opening larger in diameter than the pipe sections, a ring seal disposed in each of said annular chambers, a circular sleeve for each of said chambers one end of which sleeve extends into the circular opening in the corresponding end wall in surrounding relation to the corresponding pipe section, a separate preformed metallic helical band coaxially surrounding each of the said sleeves and attached thereto adjacent each end turn, each of said end walls having a circumferentially extending radial slot through which the turns of the corresponding said band may be screwed by rotation of said sleeve thereby introducing an increasing number of turns of the respective band into each of said annular chambers to effect compression of the ring seal therein into sealing relation to the associated pipe section.

14. A pipe coupling device according to claim 13, wherein each of said sleeves has an outwardly extending radial flange at the outer end thereof, and means on said flanges for engagement by a tool to exert a rotational torque on said sleeves.

15. A pipe coupling device according to claim 13, wherein each of said annular chambers has a conical inner wall sloping radially outward and joined to said end wall thereof, and wherein each of said ring seals has a corresponding outer conical shape which cooperates with said conical inner wall in response to an axial force exerted therein by said helical band to seal against the end of the associated pipe section.

16. A pipe coupling device according to claim 13, wherein an annular bearing member is interposed in each of said chambers between the ring seal and the innermost end turn of said helical band.

17. A pipe coupling device according to claim 13, wherein said annular chambers are of substantial axial length, and wherein a relatively wide spacer ring is interposed in each chamber between the ring seal and the innermost end turn of the helical band projecting thereinto, said spacer rings having a conical surface at the inner end thereof, and wherein a metallic split-ring having a serrated inner surface and a conical outer periphery cooperates with the conical surface on each of said spacer rings, the axially exerted pressure on said spacer rings causing said metallic split-ring to be circumferentially constricted into gripping relation with the associated pipe sections to inhibit separation of said pipe sections under tension.

18. A pipe coupling device according to claim 17, wherein said sleeves are severed circumferentially after said ring seals are actuated into sealed relation with the pipe sections, and wherein said sleeves and said housing are bonded to the corresponding pipe section at the line of severance of the sleeves.

* * * * *